United States Patent
Lehmann et al.

(12)

(10) Patent No.: US 6,281,339 B1
(45) Date of Patent: Aug. 28, 2001

(54) ADDITION PRODUCTS OF ACRYLOYLAMINO-SUBSTITUTED DYES, AND THE PREPARATION AND USE THEREOF

(75) Inventors: Urs Lehmann, Basel; Marcel Frick, Reinach, both of (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/660,846

(22) Filed: Sep. 13, 2000

(30) Foreign Application Priority Data

Sep. 16, 1999 (CH) .................................................. 1701/99

(51) Int. Cl.⁷ .......................... C09B 62/465; C09D 11/02; D06P 1/384
(52) U.S. Cl. .......................... 534/617; 534/618; 534/619; 534/636; 534/638; 534/643; 540/130; 544/77; 544/189; 552/230
(58) Field of Search .................................... 534/617, 618, 534/619, 636, 638, 643; 540/130; 544/77, 189; 552/230

(56) References Cited

U.S. PATENT DOCUMENTS

| | | | |
|---|---|---|---|
| 2,436,115 | * 2/1948 | McNally et al. | 534/643 |
| 2,720,517 | * 10/1955 | Kartaschoff et al. | 534/643 |
| 3,184,280 | * 5/1965 | Zerweck et al. | 534/643 |
| 3,215,686 | * 11/1965 | Zerweck et al. | 534/643 |
| 3,296,284 | 1/1967 | Schoenauer | 260/372 |
| 3,316,239 | 4/1967 | Rist et al. | 260/163 |
| 3,558,592 | 1/1971 | De Montmollin | 260/199 |
| 3,755,290 | 8/1973 | De Montmollin et al. | 260/196 |
| 3,891,618 | 6/1975 | De Montmollin et al. | 260/163 |
| 3,923,778 | 12/1975 | De Montmollin et al. | 260/174 |
| 4,855,410 | 8/1989 | Oxenius et al. | 534/591 |
| 4,885,360 | 12/1989 | Scheibli | 534/642 |
| 4,917,705 | 4/1990 | Mausezahl et al. | 8/549 |
| 5,480,976 | 1/1996 | Tzikas et al. | 534/642 |
| 5,523,397 | 6/1996 | Tzikas et al. | 534/642 |
| 5,554,733 | 9/1996 | Tzikas et al. | 534/638 |
| 5,684,138 | 11/1997 | Klier et al. | 534/612 |
| 5,717,078 | 2/1998 | Tzikas et al. | 534/634 |
| 5,750,662 | 5/1998 | Reichert et al. | 534/612 |
| 5,760,194 | 6/1998 | Lehmann et al. | 534/636 |
| 5,760,195 | 6/1998 | Lehmann et al. | 534/638 |
| 5,779,740 | 7/1998 | Lehmann et al. | 8/549 |
| 5,831,040 | 11/1998 | Reichert | 534/637 |
| 5,837,827 | 11/1998 | Reichert et al. | 534/618 |
| 5,849,887 | 12/1998 | Lehmann et al. | 534/642 |
| 5,936,072 | 8/1999 | Tzikas et al. | 534/618 |
| 5,989,297 | 11/1999 | Reichert et al. | 8/549 |

FOREIGN PATENT DOCUMENTS

1444591 * 11/1968 (DE) .
1444589 * 12/1968 (DE) .

OTHER PUBLICATIONS

Schallner et al., Chemical Abstracts, 95:44720, 1981.*

* cited by examiner

Primary Examiner—Fiona T. Powers
(74) Attorney, Agent, or Firm—Kevin T. Mansfield

(57) ABSTRACT

Monoazo, polyazo, metal complex azo, anthraquinone, phthalocyanine, formazan or dioxazine dyes comprising at least one structural unit of formula (1)

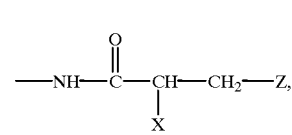

(1)

wherein

Z is $C_1$–$C_{24}$alkoxy unsubstituted or substituted in the alkyl moiety, or uninterrupted or interrupted in the alkyl moiety by oxygen; phenoxy unsubstituted or substituted in the phenyl ring; $C_1$–$C_4$alkylthio unsubstituted or substituted in the alkyl moiety; phenylthio unsubstituted or substituted in the phenyl ring; amino; N-mono- or N,N-di-$C_1$–$C_{24}$-alkylamino, unsubstituted or substituted in the alkyl moiety, or uninterrupted or interrupted in the alkyl moiety by oxygen or by a radical —$NR_1$— in which $R_1$ is hydrogen or $C_1$–$C_4$alkyl; $C_{10}$–$C_{20}$terpeneamino; $C_5$–$C_7$cycloalkylamino unsubstituted or substituted in the cycloalkyl ring; phenyl- or naphthyl-amino or N—$C_1$–$C_4$alkyl-N-phenyl- or N—$C_1$–$C_4$alkyl-N-naphthyl-amino, each unsubstituted or substituted in the aryl moiety; morpholino; piperazin-1-yl or piperidin-1-yl, and X is hydrogen, hydroxy, chlorine or bromine, or X has the meanings given for Z, yield dyeings or prints having good fastness to light and high color brilliance.

13 Claims, No Drawings

ADDITION PRODUCTS OF ACRYLOYLAMINO-SUBSTITUTED DYES, AND THE PREPARATION AND USE THEREOF

The present invention relates to new dyes that can be obtained from reactive dyes having at least one acryloylamino radical by the addition of particular nitrogen-, oxygen- or sulfur-containing nucleophilic compounds.

The dyes of the present invention are suitable especially for printing textile fibre materials, paper, plastics films or aluminium foils, preferably using the ink-jet printing method, and for dyeing textile fibre materials, paper, aluminium sheets or foils using traditional dyeing and printing methods, and yield dyeings and prints having good fastness to light and high colour brilliance.

The present invention accordingly relates to monoazo, polyazo, metal complex azo, anthraquinone, phthalocyanine, formazan or dioxazine dyes comprising at least one structural unit of formula (1)

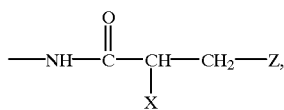
(1)

wherein

Z is $C_1$–$C_{24}$alkoxy unsubstituted or substituted in the alkyl moiety, or uninterrupted or interrupted in the alkyl moiety by oxygen; phenoxy unsubstituted or substituted in the phenyl ring; $C_1$–$C_4$alkylthio unsubstituted or substituted in the alkyl moiety; phenylthio unsubstituted or substituted in the phenyl ring; amino; N-mono- or N,N-di-$C_1$–$C_{24}$alkylamino, unsubstituted or substituted in the alkyl moiety, or uninterrupted or interrupted in the alkyl moiety by oxygen or by a radical —$NR_1$— in which $R_1$ is hydrogen or $C_1$–$C_4$alkyl; $C_{10}$–$C_{20}$terpeneamino; $C_5$–$C_7$cycloalkylamino unsubstituted or substituted in the cycloalkyl ring; phenyl- or naphthyl-amino or N—$C_1$–$C_4$alkyl-N-phenyl- or N—$C_1$–$C_4$alkyl-N-naphthyl-amino, each unsubstituted or substituted in the aryl moiety; morpholino; piperazin-1-yl or piperidin-1-yl, and X is hydrogen, hydroxy, chlorine or bromine, or X has the meanings given for Z.

Z as $C_1$–$C_{24}$alkoxy, preferably as $C_1$–$C_{12}$alkoxy and especially as $C_1$–$C_4$alkoxy, is, for example, methoxy, ethoxy, propoxy, isopropoxy, n-butoxy, sec-butoxy, isobutoxy or tert-butoxy. The mentioned radicals are unsubstituted or substituted in the alkyl moiety, for example by $C_1$–$C_4$alkoxy, e.g. methoxy or ethoxy; hydroxy; sulfo; sulfato or by carboxy. Radicals interrupted in the alkyl moiety by oxygen and unsubstituted or further substituted in the alkyl moiety are, for example, polyalkylene oxides having from 4 to 24 carbon atoms, for example polyethylene oxide of formula —(O—$CH_2$—$CH_2$)$_{2-12}$—OH, polypropylene oxide of formula

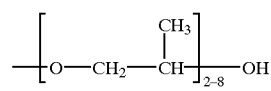

and mixed polyethylene oxide/polypropylene oxide. The hydroxy group of the mentioned polyalkylene oxide radicals may be etherified, for example by $C_1$–$C_4$alkyl, e.g. methyl or ethyl.

Z as $C_1$–$C_4$alkylthio is, for example, methylthio, ethylthio, propylthio, isopropylthio or n-butylthio. The mentioned radicals are unsubstituted or substituted in the alkyl moiety, for example by $C_1$–$C_4$alkoxy, e.g. methoxy or ethoxy; hydroxy; sulfo or by carboxy. Preference is given to those radicals substituted by one or two radicals from the group hydroxy, sulfo and carboxy.

Z as phenoxy or phenylthio can include both the unsubstituted radicals and radicals substituted in the phenyl ring, for example by $C_1$–$C_4$alkyl, e.g. methyl or ethyl, unsubstituted or further substituted, for example by carboxy; $C_1$–$C_4$alkoxy, for example methoxy or ethoxy; carboxy; $C_2$–$C_4$alkanoylamino, for example acetylamino or propionylamino; carbamoyl; N—$C_1$–$C_4$alkylcarbamoyl unsubstituted or further substituted in the alkyl moiety, for example by carboxy, for example N-carboxymethylcarbamoyl; sulfamoyl; N—$C_1$–$C_4$alkylsulfamoyl; sulfo or by halogen, for example chlorine or bromine. Preference is given to the substituted radicals, preferably to those radicals substituted by carboxy, carboxymethyl, N-carboxymethylcarbamoyl or by sulfo, especially to those substituted by carboxy or sulfo.

Z as N-mono- or N,N-di-$C_1$–$C_{24}$alkylamino is, for example, methylamino, ethylamino, N,N-di-methylamino, N,N-diethylamino, isopropylamino, n-butylamino, sec-butylamino, isobutylamino or tert-butylamino, linear or branched pentylamino, hexylamino, heptylamino, octylamino, nonylamino, decylamino, undecylamino, dodecylamino, tridecylamino or tetradecylamino. The mentioned radicals are unsubstituted or substituted in the alkyl moiety, for example by phenyl, which may itself be substituted by carboxy, carbamoyl, sulfo or by sulfamoyl; amino; $C_2$–$C_4$alkanoylamino, for example acetylamino or propionylamino; $C_1$–$C_4$alkoxy, for example methoxy or ethoxy; hydroxy; sulfo; sulfato; carboxy; carbamoyl or by sulfamoyl. The mentioned radicals are uninterrupted or interrupted in the alkyl moiety by oxygen or by —$NR_1$— in which $R_1$ is hydrogen or, for example, methyl or ethyl, preferably hydrogen.

As examples of radicals substituted in the alkyl moiety, and/or interrupted in the alkyl moiety by oxygen or by —NH—, the following radicals may be mentioned: N-β-aminoethylamino, N-β-aminopropylamino, N-β-hydroxyethylamino, N,N-di-β-hydroxyethylamino, N-2-(β-hydroxyethoxy)ethylamino, N-2-[2-(β-hydroxyethoxy)ethoxy]ethylamino, N-2-(β-hydroxyethylamino)ethylamino, N-2-(β-aminoethylamino)ethylamino, polyethyleneimines of formula —(NH—$CH_2$—$CH_2$)$_3$—$NH_2$ or —(NH—$CH_2$—$CH_2$)$_4$—$NH_2$, N-βsulfatoethylamnino, N-β-sulfoethylamino, N-carboxymethylamino, N-β-carboxyethylamino, N-αβ-dicarboxethylamino, N-α,γ-dicarboxypropylamino, N-ethyl-N-β-hydroxyethylamino and N-methyl-N-β-hydroxyethylamino.

Suitable unsubstituted and uninterrupted radicals that are branched in the alkyl moiety correspond, for example, to formula

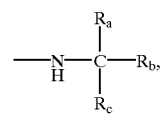
(I)

wherein the sum of the carbon atoms $R_a$+$R_b$+$R_c$ is from 11 to 14. As an example of the amines forming the basis of the radical of the formula above there may be mentioned ®Primene 81 R (Rohm & Haas).

Z as N-mono- or N,N-di-$C_1$–$C_{24}$alkylamino substituted in the alkyl moiety, and/or interrupted in the alkyl moiety by oxygen or by —$NR_1$— in which $R_1$ has the meanings and preferred meaning given above is preferably N-mono- or N,N-di-$C_1$–$C_6$alkylamino and especially N-mono- or N,N-di-$C_1$–$C_4$alkylamino.

For Z as N-mono- or N,N-di-$C_1$–$C_{24}$alkylamino preference is given to those radicals substituted in the alkyl moiety by phenyl, amino, hydroxy, sulfo, sulfato, carboxy or by carbamoyl, especially by phenyl, amino, sulfo, sulfato, carboxy or by carbamoyl, and uninterrupted or interrupted in the alkyl moiety by —NH—.

Z as $C_{10}$–$C_{20}$terpeneamino, preferably $C_{20}$diterpeneamino, is an amino group mono- substituted on the nitrogen by a terpene hydrocarbon radical. There come into consideration as terpene hydrocarbon radical, for example, acyclic, monocyclic or bicyclic $C_{10}$terpenes, acyclic, monocyclic, bicyclic or tricyclic $C_{15}$sesquiterpenes, acyclic, monocyclic or tricyclic $C_{20}$terpenes, especially tricyclic $C_{20}$diterpenes and, more especially, dehydrogenated tricyclic $C_{20}$diterpenes, such as those derived from dehydroabietic acid. As an example of such a dehydrogenated tricyclic $C_{20}$diterpeneamino radical there may be mentioned the radical of formula

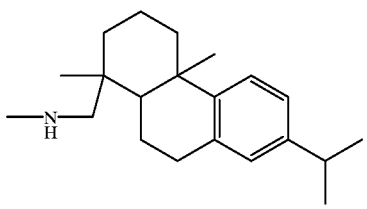

(II)

Z as $C_5$–$C_7$cycloalkylamino can include both the unsubstituted radicals and radicals substituted in the cycloalkyl ring, for example by $C_1$–$C_4$alkyl, e.g. methyl or ethyl, especially methyl, or by carboxy. Preferred as such radicals are the corresponding cyclohexyl radicals.

Z as phenylamino or N—$C_1$–$C_4$alkyl-N-phenylamino, preferably phenylamino, can include both the unsubstituted radicals and radicals substituted in the phenyl ring, for example by $C_1$–$C_4$-alkyl, e.g. methyl or ethyl, unsubsbtuted or further substituted, for example by carboxy; $C_1$–$C_4$alkoxy, for example methoxy or ethoxy; carboxy; carbamoyl; N—$C_1$–$C_4$alkylcarbamoyl unsubstituted or further substituted in the alkyl moiety, for example by carboxy, for example N-carboxymethylcarbamoyl; sulfo or by halogen, for example chlorine or bromine. Preference is given to the substituted radicals, preferably to those radicals substituted by carboxy, carboxymethyl, N-carboxymethylcarbamoyl or by sulfo, especially to those substituted by sulfo.

Z as naphthylamino or N—$C_1$–$C_4$alkyl-N-naphthylamino, preferably naphthylamino, can include both the unsubstituted radicals and radicals substituted in the naphthyl ring, for example by sulfo. Preference is given to those radicals substituted by from 1 to 3, especially by 2 or 3, sulfo groups.

Preference is given to the dyes according to the invention wherein

Z is $C_1$–$C_{12}$alkoxy unsubstituted or substituted in the alkyl moiety by hydroxy, sulfo or by carboxy or uninterrupted or interrupted in the alkyl moiety by one, two or three oxygen atoms; $C_1$–$C_4$alkylthio unsubstituted or substituted in the alkyl moiety by hydroxy, sulfo or by carboxy; N-mono- or N,N-di-$C_1$–$C_{14}$alkylamino, unsubstituted or substituted in the alkyl moiety by phenyl (which may itself be substituted by carboxy, carbamoyl, sulfo or by sulfamoyl), amino, $C_2$–$C_4$alkanoylamino, hydroxy, sulfo, sulfato, carboxy, carbamoyl or by sulfamoyl or uninterrupted or interrupted in the alkyl moiety by one, two or three oxygen atoms or —NH— groups; $C_{20}$diterpeneamino; $C_5$–$C_7$cycloalkylamino unsubstituted or substituted by $C_1$–$C_4$alkyl or by carboxy; phenylamino or N—$C_1$–$C_4$alkyl-N-phenylamino, unsubstituted or substituted by carboxymethyl, $C_1$–$C_4$alkoxy, carboxy, carbamoyl, N—$C_1$–$C_4$-alkylcarbamoyl (which may itself be further substituted in the alkyl moiety by carboxy), sulfo or by halogen; naphthylamino substituted in the aryl moiety by sulfo; morpholino; piperazin-1-yl or piperidin-1-yl.

Special preference is given to the dyes according to the invention wherein

Z is $C_1$–$C_4$alkylthio unsubstituted or substituted in the alkyl moiety by hydroxy, sulfo or by carboxy; N-mono- or N,N-di-$C_1$–$C_{14}$alkylamino, unsubstituted or substituted in the alkyl moiety by phenyl (which may itself be substituted by carboxy, carbamoyl, sulfo or by sulfamoyl), amino, $C_2$–$C_4$alkanoylamino, hydroxy, sulfo, sulfato, carboxy, carbamoyl or by sulfamoyl or uninterrupted or interrupted in the alkyl moiety by one, two or three —NH— groups; $C_{20}$diterpeneamino; phenylamino or N—$C_1$–$C_4$alkyl-N-phenylamino, unsubstituted or substituted by carboxymethyl, $C_1$–$C_4$alkoxy, carboxy, carbamoyl, N—$C_1$–$C_4$alkylcarbamoyl (which may itself be further substituted in the alkyl moiety by carboxy), sulfo or by halogen; naphthylamino substituted in the aryl moiety by sulfo; morpholino; piperazin-1-yl or piperidin-1-yl.

More especially preferred are the dyes according to the invention wherein

Z is $C_1$–$C_4$alkylthio unsubstituted or substituted in the alkyl moiety by hydroxy, sulfo or by carboxy; N-mono-$C_1$–$C_6$alkylamino unsubstituted or substituted in the alkyl moiety by phenyl (which may itself be substituted by carboxy), amino, hydroxy, sulfo, sulfato, carboxy or by carbamoyl or uninterrupted or interrupted in the alkyl moiety by one or two —NH— groups; N,N-di-$C_1$–$C_6$alkylamino unsubstituted or substituted in the alkyl moiety by amino, hydroxy, sulfo, sulfato, carboxy or by carbamoyl; morpholino or piperazin-1-yl.

Preference is given to the dyes according to the invention wherein

X is hydroxy, chlorine or bromine, or X has the meanings given above for Z.

Preference is given especially to the dyes according to the invention wherein

X is bromine, or X has the meanings given above for Z.

Preference is given more especially to the dyes according to the invention wherein X is bromine.

Where X has the meanings given for Z, the preferred meanings given for Z also apply.

In an advantageous embodiment of the dyes according to the invention

Z is $C_{10}$–$C_{20}$terpeneamino, preferably $C_{20}$diterpeneamino, or is N-mono- or N,N-di-$C_1$–$C_{24}$-alkylamino, unsubstituted and uninterrupted in the alkyl moiety, preferably N-mono- or N,N-di-$C_4$–$C_{20}$alkylamino and especially N-mono-$C_8$–$C_{16}$alkylamino, which may be straight-chain or branched, e.g. Z as radical of the above-mentioned formula (I) or (II). Such dyes are suitable, for example, for the preparation of non-aqueous inks for printing, especially for printing aluminium sheets or foils.

The dyes according to the invention preferably comprise at least one sulfo group.

The sulfo groups in the dyes according to the invention are either in the form of the free sulfo acid or, preferably, in the form of a salt thereof, for example in the form of a sodium, lithium, potassium or ammonium salt or in the form of a salt of an organic amine, e.g. a triethanolammonium salt.

The dyes according to the invention can comprise as colour-providing molecule portion (chromophore) one or more radicals from the group of monoazo, polyazo, metal complex azo, stilbene, anthraquinone, phthalocyanine, formazan and dioxazine chromophores. Suitable radicals from the group of the mentioned chromophores are specified, for example, in U.S. Pat. Nos. 5,684,138, 5,717,078, 5,837,827 and 5,989,297.

When the dyes according to the invention comprise more than one chromophore, for example two chromophores, these are bonded to one another by a bridge member. A wide variety of radicals come into consideration as the bridge member. The bridge member is, for example, an aliphatic, aromatic or heterocyclic radical; the bridge member may also be composed of various such radicals. The bridge member generally comprises at least two functional groups, for example a carbonyl, sulfonyl, carbonylamino, sulfonylamino or amino group, it being possible for an amino group to be further substituted by $C_1$–$C_4$alkyl that is unsubstituted or substituted by halogen, hydroxy, cyano, $C_1$–$C_4$alkoxy, $C_1$–$C_4$alkoxy-carbonyl, carboxy, sulfamoyl, sulfo or by sulfato. As aliphatic radical there comes into consideration, for example, an alkylene radical having from 1 to 10 carbon atoms or the branched isomers thereof. The carbon chain of the alkylene radical may be interrupted by a hetero atom, for example an oxygen atom. The term *aliphatic radical* also includes cycloaliphatic radicals. As aromatic radical there comes into consideration, for example, a naphthylene radical, the radical of a diphenyl or of a stilbene or, especially, a phenylene radical, which may be substituted by $C_1$–$C_4$alkyl, for example methyl or ethyl, $C_1$–$C_4$alkoxy, for example methoxy or ethoxy, halogen, for example fluorine, bromine or especially chlorine, carboxy or by sulfo, and as heterocyclic radical there comes into consideration, for example, a triazine radical, it being possible for the triazine radical to incorporate a removable substituent, for example fluorine or chlorine. Such dyes are specified, for example, in U.S. Pat. No. 5,750,662 and in the above-mentioned publications.

The dyes according to the invention preferably comprise as colour-providing molecule portion a chromophore from the above-mentioned group and no further chromophores.

The radical of formula (1) and the chromophore can be bonded to one another by a bridge member. In addition to the direct bond, a wide variety of radicals come into consideration as the bridge member. The bridge member is, for example, an aliphatic, aromatic or heterocyclic radical; the bridge member may also be composed of various such radicals. When the bridge member is not a direct bond, it generally comprises at least one functional group, for example a carbonyl, sulfonyl, carbonylamino, sulfonylamino or amino group, it being possible for an amino group to be further substituted by $C_1$–$C_4$alkyl that is unsubstituted or substituted by halogen, hydroxy, cyano, $C_1$–$C_4$alkoxy, $C_1$–$C_4$alkoxycarbonyl, carboxy, sulfamoyl, sulfo or by sulfato. As aliphatic radical there comes into consideration, for example, an alkylene radical having from 1 to 7 carbon atoms or the branched isomers thereof. The carbon chain of the alkylene radical may be interrupted by a hetero atom, for example an oxygen atom. As aromatic radical there comes into consideration, for example, a phenylene radical that may be substituted by $C_1$–$C_4$alkyl, for example methyl or ethyl, $C_1$–$C_4$alkoxy, for example methoxy or ethoxy, halogen, for example fluorine, bromine or especially chlorine, carboxy or by sulfo, and as heterocyclic radical there comes into consideration, for example, a piperazine or triazine radical, it being possible for the triazine radical to incorporate a removable substituent, for example fluorine or chlorine.

Special preference is given to dyes corresponding to formula (2)

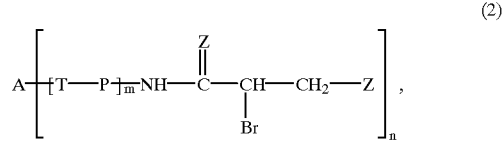

wherein

A is the radical of a monoazo, polyazo, metal complex azo, anthraquinone, phthalocyanine, formazan or dioxazine chromophore, T is a radical of formula

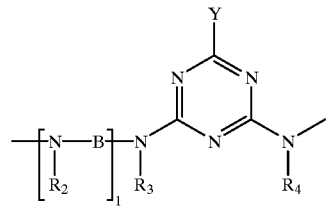

and

B is a branched or straight-chain $C_2$–$C_{12}$alkylene radical that may be interrupted by 1, 2 or 3 —O— members and is unsubstituted or substituted by hydroxy, sulfo, sulfato, cyano or by carboxy, or a phenylene radical unsubstituted or substituted by $C_1$–$C_4$alkyl, $C_1$–$C_4$alkoxy, $C_2$–$C_4$-alkanoylamino, sulfo, halogen or by carboxy, $R_2$, $R_3$ and $R_4$ are each independently of the others hydrogen or unsubstituted or substituted $C_1$–$C_4$alkyl, Y is halogen or hydroxy, or has the meanings and preferred meanings given above for Z and I is the number 0 or 1, preferably 0, P is a phenylene radical unsubstituted or substituted by $C_1$–$C_4$alkyl, $C_1$–$C_4$alkoxy, $C_2$–$C_4$-alkanoylamino, sulfo, halogen or by carboxy, Z has the meanings and preferred meanings given above, m is the number 0 or 1 and n is the number 1 or 2, preferably 1.

There come into consideration as $C_1$–$C_4$alkyl for $R_2$, $R_3$ and $R_4$, each independently of the others, for example, methyl, ethyl, propyl, isopropyl, n-butyl, sec-butyl, tert-butyl or isobutyl, preferably methyl or ethyl and especially methyl. The radicals indicated are unsubstituted or substituted by halogen, hydroxy, cyano, $C_1$–$C_4$alkoxy, $C_1$–$C_4$alkoxycarbonyl, carboxy, sulfamoyl, sulfo or by sulfato. Preference is given to the unsubstituted radicals.

There come into consideration as halogen for Y, for example, fluorine, chlorine or bromine, preferably fluorine or chlorine and especially chlorine.

$R_2$, $R_3$ and $R_4$ are preferably each independently of the others hydrogen or $C_1$–$C_4$alkyl and especially hydrogen.

B is preferably a branched or straight-chain $C_2$–$C_{12}$alkylene radical, especially a $C_2$–$C_6$-alkylene radical that may be interrupted by 1, 2 or 3 —O— members and is unsubstituted or substituted by hydroxy or sulfato.

P is preferably a phenylene radical unsubstituted or substituted by $C_1$–$C_4$alkyl, $C_1$–$C_4$alkoxy, sulfo or by halogen, preferably by sulfo.

The radical T is preferably bonded to the radical A by way of B.

Preference is given to the dyes according to the invention wherein

A is the radical of a monoazo, polyazo, metal complex azo, anthraquinone or formazan chromophore, especially of a monoazo, polyazo or metal complex azo chromophore.

Special preference is given to dyes wherein

A is the radical of formula (3) or (4)

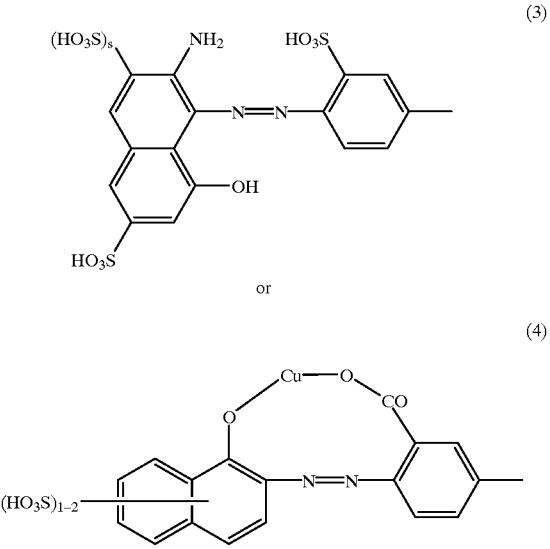

(3)

or (4)

and s is the number 0 or 1.

The radical of formula (4) is preferably a radical of formula (4a)

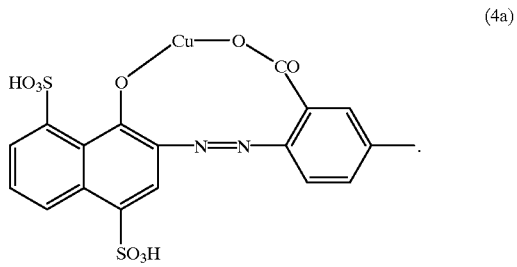

(4a)

Preference is given to dyes of formula (2) wherein

A is a radical of formula (3) or (4), especially (3) or (4a), and s is the number 0 or 1, Z is $C_1$–$C_4$alkylthio unsubstituted or substituted in the alkyl moiety by hydroxy, sulfo or by carboxy; N-mono-$C_1$–$C_6$alkylamino unsubstituted or substituted in the alkyl moiety by phenyl (which may itself be substituted by carboxy), amino, hydroxy, sulfo, sulfato, carboxy or by carbamoyl or uninterrupted or interrupted in the alkyl moiety by one or two —NH— groups; N,N-di-$C_1$–$C_6$alkylamino unsubstituted or substituted in the alkyl moiety by amino, hydroxy, sulfo, sulfato, carboxy or by carbamoyl; morpholino or piperazin-1-yl, P is a phenylene radical unsubstituted or substituted by sulfo, m is the number 0 or 1, n is the number 1, T is the radical given hereinbefore, wherein $R_3$ and $R_4$ are hydrogen, Y is halogen or hydroxy, or has the meanings given above for Z, and I is the number 0.

Special preference is given to dyes of formula (2) wherein

A is a radical of formula (3), s is the number 0 or 1,

Z is $C_1$–$C_4$alkylthio unsubstituted or substituted in the alkyl moiety by hydroxy, sulfo or by carboxy; N-mono-$C_1$–$C_6$alkylamino unsubstituted or substituted in the alkyl moiety by phenyl (which may itself be substituted by carboxy), amino, hydroxy, sulfo, sulfato, carboxy or by carbamoyl or uninterrupted or interrupted in the alkyl moiety by one or two —NH— groups; N,N-di-$C_1$–$C_6$alkylamino unsubstituted or substituted in the alkyl moiety by amino, hydroxy, sulfo, sulfato, carboxy or by carbamoyl; morpholino or piperazin-1-yl, P is a phenylene radical unsubstituted or substituted by sulfo, m is the number 0 or 1, n is the number 1, T is the radical given hereinbefore, wherein $R_3$ and $R_4$ are hydrogen, Y is halogen or hydroxy, or has the meanings given above for Z, and I is the number 0.

Special preference is given also to dyes of formula (2) wherein

A is the radical of formula (4a), and

Z is $C_1$–$C_4$alkylthio unsubstituted or substituted in the alkyl moiety by hydroxy, sulfo or by carboxy; N-mono-$C_1$–$C_6$alkylamino unsubstituted or substituted in the alkyl moiety by phenyl (which may itself be substituted by carboxy), amino, hydroxy, sulfo, sulfato, carboxy or by carbamoyl or uninterrupted or interrupted in the alkyl moiety by one or two —NH— groups; N,N-di-$C_1$–$C_6$alkylamino unsubstituted or substituted in the alkyl moiety by amino, hydroxy, sulfo, sulfato, carboxy or by carbamoyl; morpholino or piperazin-1-yl, m is the number 0 and n is the number 1.

The present invention relates also to a process for the preparation of the dyes according to the invention that comprise at least one structural unit of formula (1), in which process a monoazo, polyazo, metal complex azo, anthraquinone, phthalocyanine, formazan or dioxazine dye comprising at least one structural unit of formula (5)

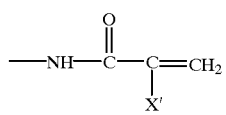

(5)

or at least one precursor corresponding to the structural unit of formula (5) is reacted with a compound of formula (6)

in an amount at least equimolar to the structural units of formula (5) or the precursor thereof in the dye molecule, in which formulae X' is hydrogen, chlorine or bromine, preferably bromine, and Z has the meanings and preferred meanings given above.

It is advantageous to use an excess of the compound of formula (6) in relation to the structural units of formula (5) or the precursor thereof in the dye molecule, for example a molar excess of from 1.2 to 20, preferably from 1.5 to 10.

By reacting a dye having at least one structural unit of formula (5) or at least one precursor corresponding to the structural unit of formula (5), wherein X' is chlorine or bromine, with a compound of formula (6) in a molar excess of at least 2, the dyes according to the invention wherein X has the meanings given for Z can be obtained.

When the dye having at least one structural unit of formula (5) or at least one precursor corresponding to the structural unit of formula (5) comprises groups that are labile under the reaction conditions, for example temperature or pH, such as halogen, for example chlorine or fluorine, bonded to a triazine radical, the labile group can be substituted when there is a suitable excess of the compound of formula (6).

The process according to the invention can also be carried out by reacting a pre-product of a monoazo, polyazo, metal complex azo, anthraquinone, phthalocyanine, formazan or dioxazine dye comprising at least one structural unit of formula (5) or at least one precursor corresponding to the structural unit of formula (5), for example a coupling component, with a compound of formula (6) and then obtaining the chromophore in the further course of the reaction, for example by means of a coupling reaction with a diazotised amine to form the monoazo or polyazo chromophore. The process according to the invention also includes that reaction variant.

The reaction is advantageously carried out in the presence of a base, for example an alkali metal hydroxide, alkali metal alcoholate or benzyltrimethylammonium hydroxide, preferably an alkali metal hydroxide, for example sodium hydroxide or potassium hydroxide, or in the presence of an acid, for example sulfuric acid, glacial acetic acid or boron trifluoride, preferably in the presence of a base.

Ammonia and aliphatic amines are sufficiently basic to be added under mild conditions, in some cases also without the presence of a base or acid. In the case of aromatic amines, however, relatively high temperatures, for example temperatures of more than 100° C., have to be used. The reaction conditions will depend upon the nucleophilicity of the compound of formula (6) and upon the electrophilicity of the radical of formula (5). The reaction is advantageously carried out at a temperature of from 10 to 120° C., preferably from 15 to 100° C. and especially from 20 to 75° C. These interdependencies are generally known and have been described sufficiently in the literature.

The compound of formula (6) is known or can be prepared according to processes known per se.

Dyes having at least one structural unit of formula (5) or at least one precursor corresponding to the structural unit of formula (5), for example α,β-di-chloro- or α,β-di-bromo-propionylamino, are known and have been described, for example, in U.S. Pat. Nos. 3,296,284, 3,316,239, 3,558,592, 3,755,290, 3,891,618, 3,923,778, 4,855,410, 4,885,360, 4,917,705, 5,480,976, 5,523,397, 5,554,733, 5,750,662, 5,760,194, 5,760,195, 5,779,740, 5,831,040, 5,849,887, 5,936,072 and 5,989,297. Dyes having at least one structural unit of formula (5) wherein X is chlorine or bromine can be prepared according to generally customary methods from the corresponding α,β-di-chloro- or α,β-di-bromo-propionylamino-substituted dyes, for example by eliminating HCl or HBr in an alkali medium.

The present invention relates also to inks, for example aqueous inks, comprising a monoazo, polyazo, metal complex azo, stilbene, anthraquinone, phthalocyanine, formazan or dioxazine dye having at least one structural unit of formula (1), wherein the meanings and preferred meanings given above for X and Z apply.

The dyes used in the inks should preferably have a low salt content, that is to say they should have a total content of salts of less than 0.5% by weight, based on the weight of the dyes. Dyes that have relatively high salt contents as a result of their preparation and/or as a result of the subsequent addition of diluents can be desalted, for example by membrane separation methods, such as ultrafiltration, reverse osmosis or dialysis.

The inks preferably have a total content of dyes of from 1 to 35% by weight, especially from 1 to 30% by weight and preferably from 1 to 20% by weight, based on the total weight of the ink. As a lower limit, preference is given to a limit of 1.5% by weight, preferably 2% by weight and especially 3% by weight.

The inks may comprise organic solvents, for example water-miscible organic solvents, for example $C_1$–$C_4$alcohols, e.g. methanol, ethanol, n-propanol, isopropanol, n-butanol, sec-butanol, tert-butanol or isobutanol; amides, e.g. dimethylformamide or dimethyl acetamide; ketones or ketone alcohols, e.g. acetone, methyl isobutyl ketone, diacetone alcohol; ethers, e.g. tetrahydrofuran or dioxane; nitrogen-containing heterocyclic compounds, e.g. N-methyl-2-pyrrolidone or 1,3-dimethyl-2-imidazolidone, polyalkylene glycols, e.g. polyethylene glycol or polypropylene glycol; $C_2$–$C_6$alkylene glycols and thioglycols, e.g. ethylene glycol, propylene glycol, butylene glycol, 1,5-pentanediol, thiodiglycol, hexylene glycol, diethylene glycol, triethylene glycol, tetraethylene glycol or diethylene glycol monobutyl ether; further polyols, e.g. glycerol, or 1,2,6-hexanetriol; and $C_1$–$C_4$alkyl ethers of polyhydric alcohols, e.g. 2-methoxyethanol, 1-methoxypropanol, 2-(2-methoxyethoxy)ethanol, 2-(2-ethoxyethoxy)-ethanol, 2-[2-(2-methoxyethoxy)ethoxy]-ethanol or 2-[2-(2-ethoxyethoxy)ethoxy]ethanol; preferably N-methyl-2-pyrrolidone, diethylene glycol, glycerol or, especially, 1,2-propylene glycol, customarily in an amount of from 2 to 30% by weight, especially from 5 to 30% by weight and preferably from 10 to 25% by weight, based on the total weight of the ink.

The inks may also comprise solubilisers, for example ε-caprolactam.

The inks may comprise thickeners of natural or synthetic origin inter alia for the purpose of adjusting the viscosity.

As examples of thickeners there may be mentioned customary commercial alginate thickeners, starch ethers or locust bean flour ethers, especially sodium alginate on its own or mixed with modified cellulose, for example methyl-, ethyl-, carboxymethyl-, hydroxyethyl-, methylhydroxyethyl-, hydroxypropyl- or hydroxypropylmethyl-cellulose, especially with preferably from 20 to 25% by weight of carboxymethylcellulose. As synthetic thickeners there may also be mentioned, for example, those based on poly(meth)acrylic acids or poly(meth)acrylamides.

The inks comprise such thickeners, for example, in an amount of from 0.01 to 2% by weight, especially from 0.01 to 1% by weight and preferably from 0.01 to 0.5% by weight, based on the total weight of the ink.

The inks may also comprise buffer substances, for example borax, borates, phosphates, polyphosphates or citrates. As examples there may be mentioned borax, sodium borate, sodium tetraborate, sodium dihydrogen phosphate, disodium hydrogen phosphate, sodium tripolyphosphate, sodium pentapolyphosphate and sodium citrate. They are used especially in amounts of from 0.1 to 3% by weight, preferably from 0.1 to 1% by weight, based on the total weight of the ink, in order to obtain a pH value of, for example, from 4 to 9, especially from 5 to 8.5.

The inks may comprise as further additives surfactants or humectants.

As surfactants there come into consideration the customary commercial anionic or non-ionic surfactants. As humectants there come into consideration, for example, urea or a mixture of sodium lactate (advantageously in the form of a from 50 to 60% aqueous solution) and glycerol and/or propylene glycol in amounts preferably of from 0.1 to 30% by weight, especially of from 2 to 30% by weight, in the inks according to the invention.

Preference is given to inks having a viscosity of from 1 to 40 mPa·s, especially from 1 to 20 mPa·s and preferably from 1 to 10 mpa·s.

The inks may also comprise further customary additives, for example antifoams or especially substances that inhibit the growth of fungi and/or bacteria. Such additives are customarily used in amounts of from 0.01 to 1% by weight, based on the total weight of the ink.

The inks can be prepared in customary manner by mixing the individual constituents, for example, in the desired amount of water.

The inks according to the invention are suitable especially for use in recording systems of the type in which an ink is expressed in the form of droplets from a small aperture, the droplets being directed onto a substrate on which an image is produced. Suitable substrates are, for example, textile fibre materials, paper, plastics or aluminium foils. Suitable recording systems are, for example, customary commercial ink-jet printers for use in paper or textile printing, or writing implements, such as fountain pens or ballpoint pens, and especially ink-jet printers.

Depending upon the type of use, it may be necessary, for example, to adjust the viscosity or other physical properties of the ink accordingly, especially those properties that have an effect upon the affinity for the substrate in question. For printing textile fibre materials, paper or plastics films, the use of aqueous inks is preferred.

As textile fibre materials there come into consideration especially nitrogen-containing or hydroxy-group-containing fibre materials, for example textile fibre materials consisting of cellulose, silk, wool or synthetic polyamides.

As examples of paper that can be printed with the inks according to the invention there may be mentioned customary commercial ink-jet paper, photographic paper, glossy paper and plastics-coated paper, for example Epson ink-jet paper, Epson photo paper, Epson glossy paper, Epson glossy film, HP special ink-jet paper, Encad photo gloss paper and Ilford photo paper. Plastics films that can be printed with the inks according to the invention are, for example, transparent or milky/opaque. Suitable plastics films are, for example, 3M transparency film.

Examples of aluminium foils are surface-treated foils, for example vinyl-coated aluminium foils.

The present invention accordingly also relates to a method for printing textile fibre materials, paper, plastics or aluminium foils, especially using the ink-jet printing method, in which method the ink used comprises a dye having at least one structural unit of formula (1) wherein the meanings and preferred meanings given above for X and Z apply.

Preference is given to ink-jet printing methods for printing textile fibre materials, paper or plastics films in which an aqueous ink is used.

In the ink-jet printing method, individual drops of ink are sprayed onto a substrate in a controlled manner from a nozzle, For this purpose, predominantly the continuous ink-jet method and the drop-on-demand method are used. In the continuous ink-jet method, the drops are produced continuously and any drops not required for the printing are conveyed to a collecting vessel and recycled. In the drop-on-demand method, however, drops are produced and printed as required, that is to say drops are produced only when required for the printing. The production of the drops can be effected, for example, by means of a piezo ink-jet head or by means of thermal energy (bubble jet). For the method according to the invention, preference is given to printing using a piezo ink-jet head. For the method according to the invention, preference is given also to printing using the continuous ink-jet method.

The recordings produced, for example prints, are distinguished especially by good fastness to light and high colour brilliance.

The dyes according to the invention are also suitable for dyeing and printing hydroxy-group-containing and nitrogen-containing fibre materials, paper and aluminium sheets or aluminium foils using methods known per se, for example immersion methods, roller printing or screen printing.

Examples of fibre materials are silk, wool, synthetic polyamide fibres and polyurethanes and also cellulose-containing fibre materials of any type. Cellulose-containing fibre materials are, for example, natural cellulose fibres, such as cotton, linen and hemp, and cellulose and regenerated cellulose. The dyes according to the invention are also suitable for dyeing or printing hydroxy-group-containing fibres contained in blended woven fabrics, for example blends of cotton and polyester fibres or polyamide fibres. The above-mentioned textile material can be present in a wide variety of processed forms, for example as fibre, yarn, woven fabric or knitted fabric.

Examples of aluminium sheets or foils are surface-treated sheets or foils, for example vinyl-coated aluminium sheets or foils.

The present invention accordingly also relates to the use of the dyes according to the invention for dyeing or printing textile fibre materials, especially hydroxy-group-containing or nitrogen-containing fibre materials, paper, aluminium sheets or aluminium foils.

The dyes according to the invention can be used for dyeing or printing in a generally customary form that may have been prepared in advance, for example in the form of an aqueous dye solution for the exhaust process or in the form of a print paste for use in screen printing.

Dyeings and prints are obtained that have good allround properties, especially good fastness to rubbing, to wetting, to wet-rubbing and to light, and high colour brilliance.

The following Examples serve to illustrate the invention. The temperatures are given in degrees Celsius, parts are parts by weight, and the percentages relate to percent by weight, unless otherwise indicated. Parts by weight relate to parts by volume in a ratio of kilograms to liters.

EXAMPLE 1

11.8 parts of the dye of formula

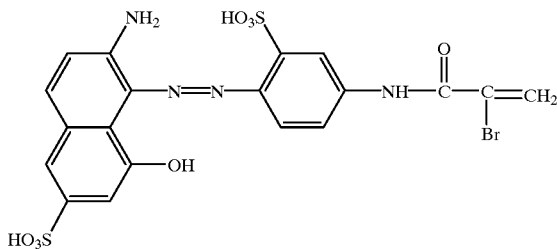

and 27.4 parts of aspartic acid are dissolved in 400 parts of water. A 30% sodium hydroxide solution is added dropwise at room temperature to the resulting solution, and the pH of the reaction mixture is slowly adjusted to 10. The mixture is stirred for a few hours under those conditions to complete the reaction (monitored by means of thin-layer chromatography). The reaction mixture is then adjusted to a pH of from 7.5 to 8 with 4N HCl, clarified by filtration, desalted by dialysis and freeze-dried to obtain 14.5 parts of a dye that, in the form of the free acid, corresponds to formula (101)

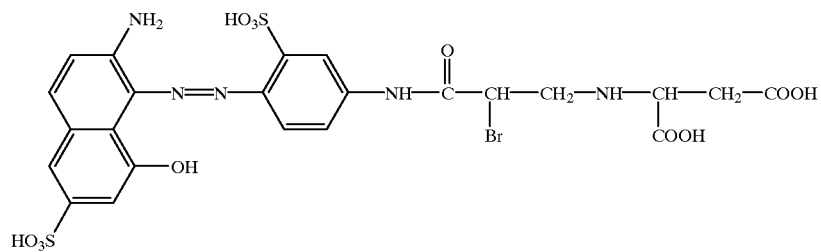

and yields prints and dyeings on cotton, wool, silk and paper in a red shade having good fastness to light and high colour brilliance.

EXAMPLES 2 to 46

The dyes of the general formula

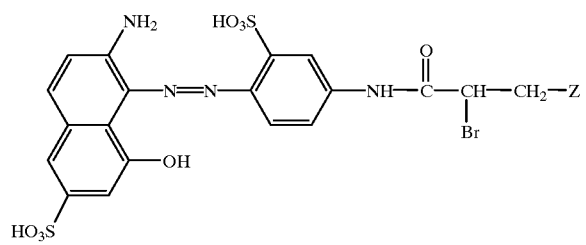

wherein Z is as defined in Table 1, can be prepared analogously to the procedure described in Example 1, using a compound of formula Z—H instead of aspartic acid.

TABLE 1

| Example | Z |
|---|---|
| 2 | —NH$_2$ |
| 3 | —N(CH$_3$)$_2$ |
| 4 | —NH—CH$_2$—CH$_3$ |
| 5 | —NH—CH$_2$—CH$_2$—OH |
| 6 | —NH—CH$_2$—CH$_2$—O—CH$_2$—CH$_2$—OH |
| 7 | —N(CH$_2$—CH$_2$—OH)(CH$_2$—CH$_3$) |
| 8 | —N(CH$_2$—CH$_2$—OH)$_2$ |
| 9 | —NH—CH$_2$—CH$_2$—NH—CH$_2$—CH$_2$—OH |
| 10 | —NH—CH$_2$—CH$_2$—NH—CH$_2$—CH$_2$—NH$_2$ |
| 11 | —NH—CH$_2$—CH(CH$_3$)—NH$_2$ |
| 12 | —NH—CH$_2$—CH$_2$—OSO$_3$H |
| 13 | —NH—CH$_2$—CH$_2$—SO$_3$H |
| 14 | —N(CH$_3$)—CH$_2$—CH$_2$—SO$_3$H |
| 15 | —NH—CH$_2$—COOH |
| 16 | —N(CH$_3$)—CH$_2$—COOH |
| 17 | —NH—CH$_2$—CH$_2$—COOH |
| 18 | —NH—CH$_2$—CH$_2$—CH$_2$—COOH |
| 19 | —NH—CH$_2$—CH$_2$—CH$_2$—CH$_2$—CH$_2$—COOH |
| 20 | —NH—(CH$_2$)$_{11}$—COOH |
| 21 | —N(CH$_2$—COOH)$_2$ |

TABLE 1-continued

| Example | Z |
|---|---|
| 22 | —NH—CH(COOH)—CH$_3$ |
| 23 | —NH—CH(COOH)—CH$_2$—OH |
| 24 | —NH—CH(COOH)—CH$_2$—CH$_2$—CONH$_2$ |
| 25 | —NH—CH(COOH)—CH$_2$—C$_6$H$_5$ |

TABLE 1-continued

| Example | Z |
|---|---|
| 26 | —NH—CH(COOH)—CH$_2$—CH$_2$—COOH |
| 27 | —N(morpholino) |
| 28 | —N(piperazinyl-NH) |
| 29 | —NH—C$_6$H$_3$(COOH)$_2$ (3,5-dicarboxyphenyl) |
| 30 | —NH—C$_6$H$_4$—COOH (2-carboxyphenyl) |
| 31 | —NH—C$_6$H$_3$(COOH)$_2$ (2,5-dicarboxyphenyl) |
| 32 | —NH—C$_6$H$_4$—SO$_3$H (2-sulfophenyl) |
| 33 | —NH—C$_6$H$_4$—SO$_3$H (4-sulfophenyl) |
| 34 | —NH—C$_6$H$_3$(SO$_3$H)$_2$ (2,5-disulfophenyl) |
| 35 | —NH—C$_6$H$_4$—CH$_2$—COOH |
| 36 | —NH—C$_6$H$_4$—CONH—CH$_2$—COOH |
| 37 | —NH—CH$_2$—C$_6$H$_4$—COOH |
| 38 | —NH-(naphthyl with SO$_3$H, SO$_3$H, SO$_3$H substituents) |
| 39 | —NH-(naphthyl with three SO$_3$H substituents) |
| 40 | —N(CH$_3$)-(naphthyl with three SO$_3$H substituents) |
| 41 | —S—CH$_2$—CH$_2$—COOH |
| 42 | —S—CH$_2$—COOH |
| 43 | —S—CH$_2$—CH$_2$—OH |
| 44 | —S—CH$_2$—CH$_2$—CH$_2$—SO$_3$H |
| 45 | —S—CH(COOH)—CH$_2$—COOH |
| 46 | —S—CH(COOH)—CH$_3$ |

The dyes yield prints and dyeings on cotton, wool, silk and paper in a red shade having good fastness to light and high colour brilliance.

EXAMPLES 47 to 50

The dyes of formulae (102), (103), (104) and (105)

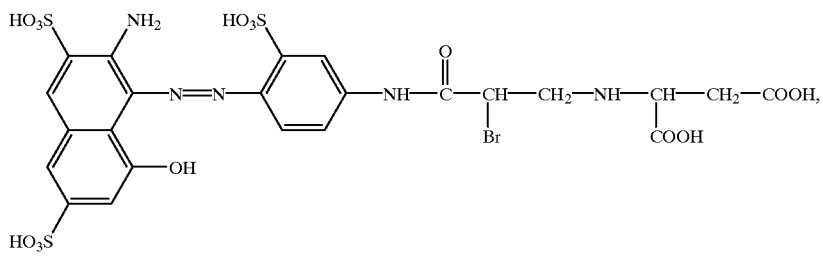
(102)

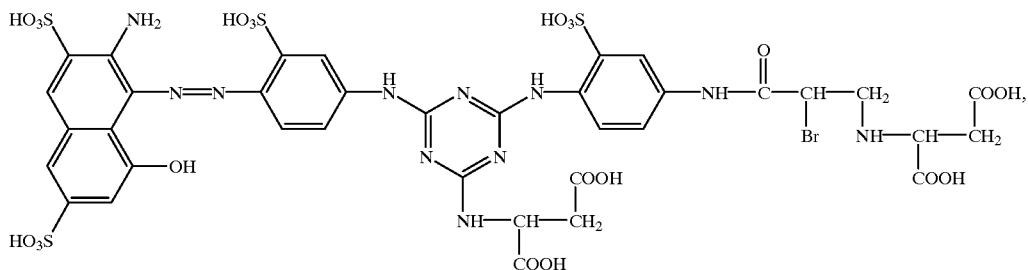
(103)

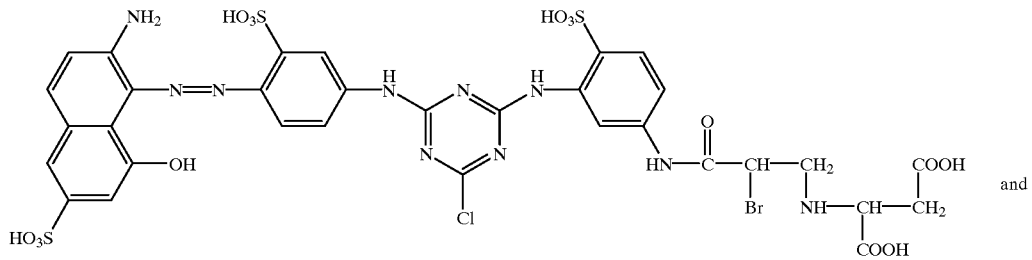
(104)

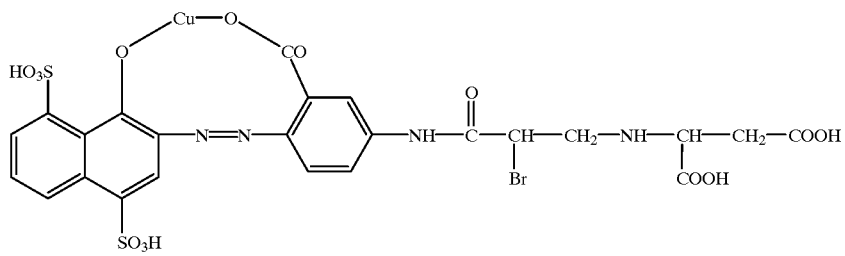
(105)

can be prepared analogously to the procedure described in Example 1. The dyes yield prints and dyeings on cotton, wool, silk and paper in a red shade having good fastness to light and high colour brilliance.

EXAMPLE 51

13.1 parts of the dye of formula

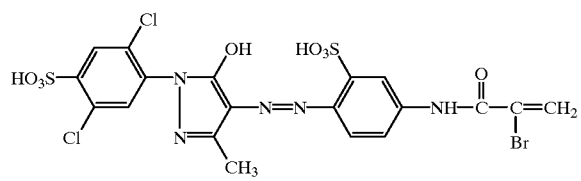

are dissolved in 250 parts of water at room temperature, and a neutral solution of 26.6 parts of aspartic acid in 50 parts of water is slowly added thereto. A 30% sodium hydroxide solution is added dropwise at room temperature to the resulting solution, and the pH of the reaction mixture is slowly adjusted to 10. The mixture is stirred for a few hours under those conditions to complete the reaction (monitored by means of thin-layer chromatography). The reaction mixture is then adjusted to a pH of 7 with 4N HCl, clarified by filtration, desalted by dialysis and freeze-dried to obtain 11.6 parts of a dye that, in the form of the free acid, corresponds to formula (106)

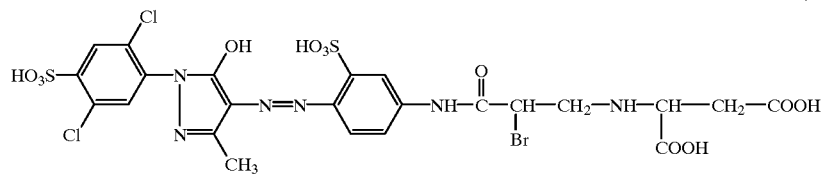

(106)

and yields prints and dyeings on cotton, wool, silk and paper in a yellow shade having good fastness to light and high colour brilliance.

EXAMPLES 52 to 57

The dyes of the general formula

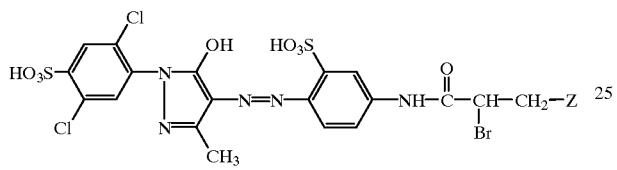

wherein Z is as defined in Table 2, can be prepared analogously to the procedure described in Example 51, using a compound of formula Z—H instead of aspartic acid.

TABLE 2

| Example | Z |
|---------|---|
| 52 | —NH—CH$_2$—CH$_2$—NH—CH$_2$—CH$_2$—NH$_2$ |
| 53 | —NH—CH$_2$—CH$_2$—N(CH$_2$—CH$_2$—NH$_2$)$_2$ |
| 54 | —N(CH$_2$—CH$_2$—OH)$_2$ |
| 55 | —N(CH$_3$)—CH$_2$—CH$_2$—SO$_3$H |
| 56 | 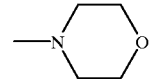 |
| 57 | —S—CH$_2$—CH$_2$—CH$_2$—SO$_3$H |

The dyes yield prints and dyeings on cotton, wool, silk and paper in a yellow shade having good fastness to light and high colour brilliance.

EXAMPLES 58 and 59

The dyes of formulae (107) and (108)

58

(107)

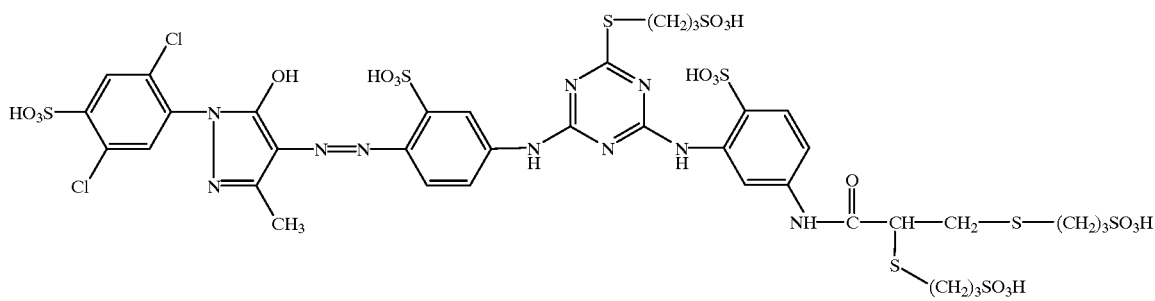

and

59

(108)

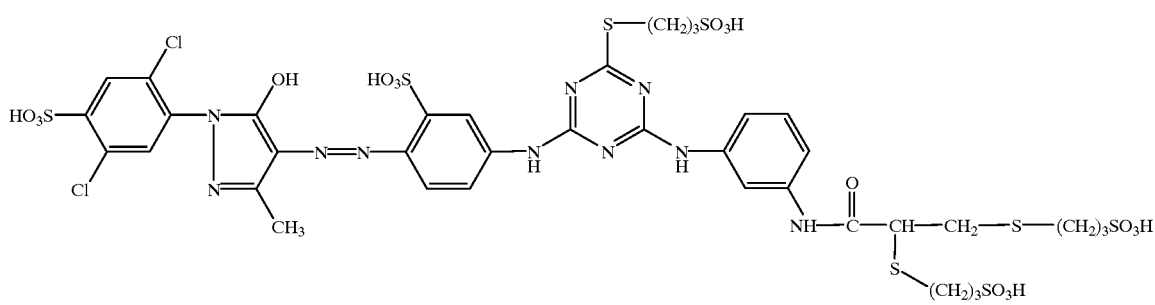

can be prepared analogously to the procedure described in Example 1 or 51. The dyes yield prints and dyeings on cotton, wool, silk and paper in a yellow shade having good fastness to light and high colour brilliance.

EXAMPLE 60

1.0 parts of the dye of formula

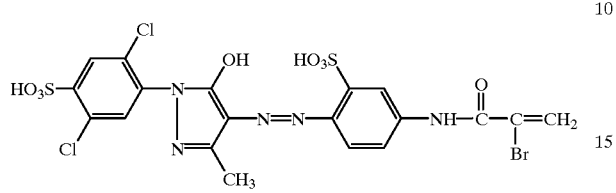

are dissolved in 25 parts of water at room temperature and the solution is adjusted to pH 10 with 0.5 part of a 2N sodium hydroxide solution. To that solution there are then added dropwise three portions, each of 6.0 parts, of a 0.25 molar solution of an amine of formula

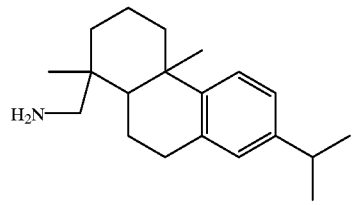

and the pH of the reaction mixture is maintained at 10 by the addition of a 1N sodium hydroxide solution. The reaction mixture is stirred for one day at room temperature to complete the reaction (monitored by means of thin-layer chromatography) and then the pH is reduced to from 7 to 7.5 by the addition of a 1N hydrochloric acid solution. The resulting precipitate is filtered off, washed thoroughly with water and dried in vacuo at 40° C. to yield 2.0 parts of a dye that, in the form of the free acid, corresponds to formula (109)

and yields prints on aluminium sheet or aluminium foil in a lemon-yellow shade having good fastness to light and high colour brilliance.

EXAMPLES 61 to 76

Valuable dyes wherein A in each case is as defined in Table 3 and Z is a radical of formula

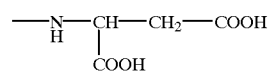

can be prepared analogously to the procedure described in Example 1 or 51 according to the scheme below. The dyes yield prints and dyeings on cotton, wool, silk and paper, in the shades indicated, having good fastness to light and high colour brilliance. The halogen atoms identified by "*" can be substituted by the radical Z, substitution depending upon the reaction conditions.

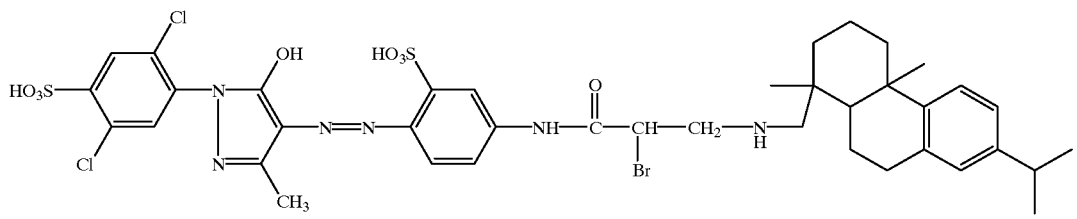

TABLE 3

$$A\left[-NH-\overset{O}{\underset{}{C}}-CH-CH_2\right]_{1-2} \xrightarrow{Z-H} A\left[-NH-\overset{O}{\underset{}{C}}-CH-CH_2-Z\right]_{1-2}$$
$$\phantom{A\left[-NH-\overset{O}{\underset{}{C}}-CH-\right.} \underset{Br\ \ Br}{} \phantom{XXXXXXXXXXXXXX} \underset{Br^*}{}$$

| Example | A | shade |
|---|---|---|
| 61 | [pyridone azo structure with CH₃, H₂NOC, N-C₂H₅, OH, N=N to tolyl-SO₃H] | lemon-yellow |
| 62 | [pyridone azo structure with CH₃, HO₃SH₂C, N-C₂H₅, OH, N=N to tolyl-SO₃H] | lemon-yellow |
| 63 | [pyridone azo structure with H₂NOC, CH₃, N-C₂H₅, OH, N=N-phenyl-SO₃H-NH-triazine(Cl*)-NH-tolyl-SO₃H] | lemon-yellow |
| 64 | [pyrazole azo: N-phenyl, NH₂, CH₃, N=N-phenyl-SO₃H-NH-triazine(Cl*)-NH-tolyl-SO₃H] | lemon-yellow |
| 65 | [naphthalene-1,6-disulfonic acid, N=N to phenyl with H₂NCONH, CH₃] | yellow |
| 66 | [naphthalene-1,5-disulfonic acid, N=N-tolyl-NH-triazine(Cl*)-NH-tolyl] | yellow |

TABLE 3-continued $$A-\left[NH-\overset{O}{\underset{}{C}}-\underset{Br}{CH}-\underset{Br}{CH_2}\right]_{1-2} \xrightarrow{Z-H} A-\left[NH-\overset{O}{\underset{}{C}}-\underset{Br^*}{CH}-CH_2-Z\right]_{1-2}$$

| Example | A | shade |
|---|---|---|
| 67 | (structure: 4-hydroxy-6-methyl-naphthalene-3-sulfonic acid azo-linked to 2-sulfo-5-methylphenyl) | orange |
| 68 | (structure: 4-hydroxy-6-methyl-naphthalene-3-sulfonic acid azo-linked to 2-sulfo-4-methylphenyl) | scarlet |
| 69 | (structure: 7-amino-8-[(4-{[4-chloro-6-(2-sulfo-4-methylanilino)-1,3,5-triazin-2-yl]amino}phenyl)azo]-1-hydroxy-naphthalene-3-sulfonic acid with Cl*) | red |
| 70 | (structure: triazine with Cl*, N-ethyl-N-phenyl amino group, linked via NH to naphthalene bearing OH, two SO$_3$H groups, azo-linked to 2-sulfo-5-methylphenyl) | red |
| 71 | (structure: 8-(4-methylbenzoylamino)-1-hydroxy-naphthalene-3,6-disulfonic acid azo-linked to 1,6-disulfonaphthalen-2-yl) | red |

TABLE 3-continued
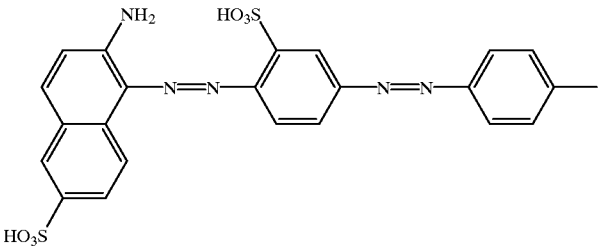
| Example | A | shade |
|---|---|---|
| 72 | 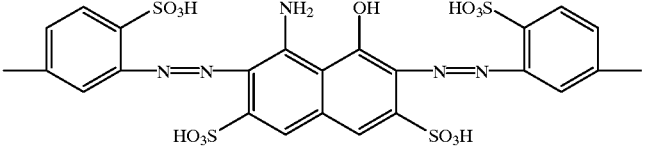 | bordeaux red |
| 73 | 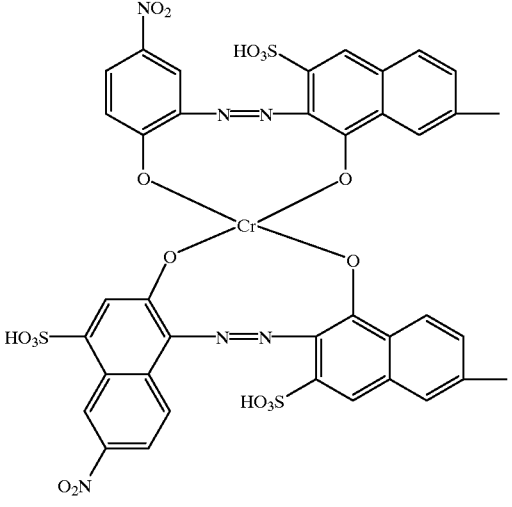 | marine |
| 74 | 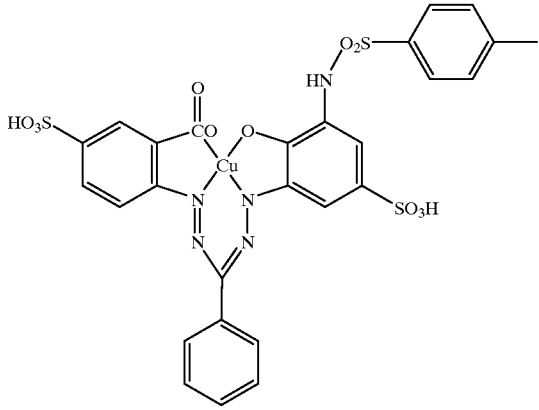 | black |
| 75 | | blue |

TABLE 3-continued $$A\left[NH-\overset{O}{\underset{\|}{C}}-\underset{Br}{CH}-CH_2\right]_{1-2} \xrightarrow{Z-H} A\left[NH-\overset{O}{\underset{\|}{C}}-\underset{Br^*}{CH}-CH_2-Z\right]_{1-2}$$

| Example | A | shade |
|---|---|---|
| 76 | 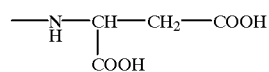 | blue |

30

EXAMPLES 77 to 95

Valuable dyes wherein A in each case is as defined in Table 4 and Z is radical of formula $$-\underset{H}{N}-CH-CH_2-COOH$$
$$\phantom{-N-}\underset{\phantom{H}}{|}$$
$$\phantom{-N-}COOH$$

can be obtained analogously to the procedure described in Example 1 or 51 according to the scheme below. The dyes yield prints and dyeings on cotton, wool, silk and paper, in the shades indicated, having good fastness to light and high colour brilliance. The halogen atoms identified by "*" can be substituted by the radical Z, substitution being dependent upon the reaction conditions.

TABLE 4

$$A\left[NH-\overset{O}{\underset{\|}{C}}-\underset{Br}{\overset{|}{C}}-CH_2\right]_{1-2} \xrightarrow{Z-H} A\left[NH-\overset{O}{\underset{\|}{C}}-\underset{Br^*}{CH}-CH_2-Z\right]_{1-2}$$

| Example | A | shade |
|---|---|---|
| 77 | (structure shown) | lemon-yellow |

TABLE 4-continued $$\left[ A\text{-}NH\text{-}\underset{\underset{Br}{|}}{\overset{\overset{O}{\|}}{C}}\text{-}CH_2 \right]_{1-2} \xrightarrow{Z-H} \left[ A\text{-}NH\text{-}\underset{\underset{Br^*}{|}}{\overset{\overset{O}{\|}}{C}}H\text{-}CH_2\text{-}Z \right]_{1-2}$$

| Example | A | shade |
|---|---|---|
| 78 | (structure) | red |
| 79 | (structure) | blue |
| 80 | (structure) | orange |
| 81 | (structure) | scarlet |

TABLE 4-continued $$A\left[NH-\underset{\underset{Br}{|}}{\overset{O}{\overset{\|}{C}}}-CH_2\right]_{1-2} \xrightarrow{Z-H} A\left[NH-\overset{O}{\overset{\|}{C}}-\underset{\underset{Br^*}{|}}{CH}-CH_2-Z\right]_{1-2}$$

| Example | A | shade |
|---|---|---|
| 82 | | scarlet |
| 83 | | blue-tinged red |
| 84 | | red |
| 85 | | red |
| 86 | | red |

TABLE 4-continued
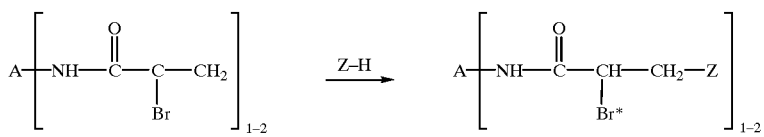
| Example | A | shade |
|---|---|---|
| 87 | | red |
| 88 | | red |
| 89 | | red |
| 90 | | yellow-tinged red |
| 91 | | blue |

TABLE 4-continued
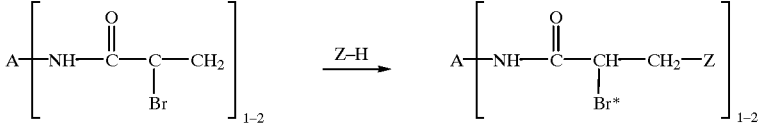
| Example | A | shade |
|---|---|---|
| 92 | 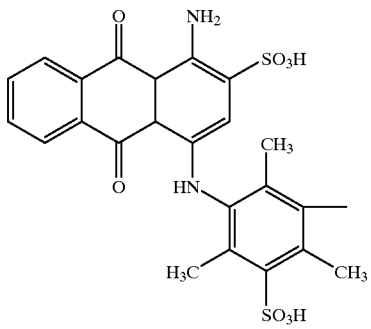 | royal blue |
| 93 | 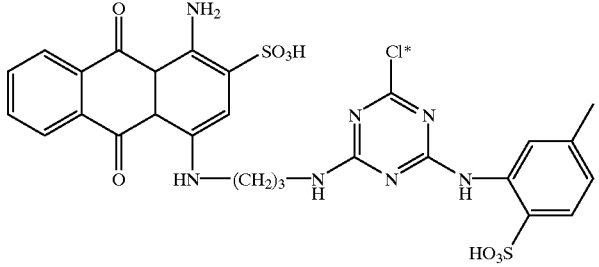 | blue |
| 94 | 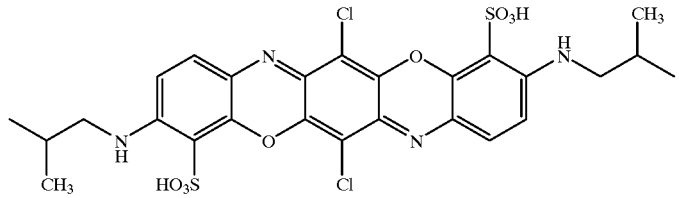 | brilliant blue |
| 95 | 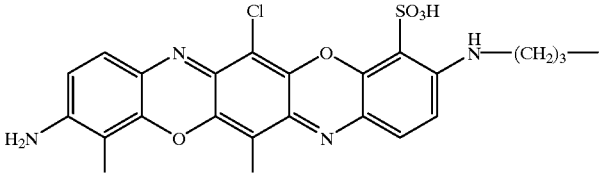 | brilliant blue |

EXAMPLE 96

The dye of formula (110)

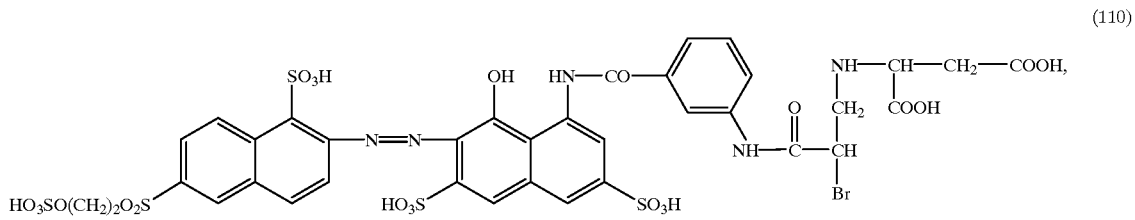

which yields prints and dyeings on cotton, wool, silk and paper in a red shade having good fastness to light and high colour brilliance, can be obtained by first reacting a compound of formula

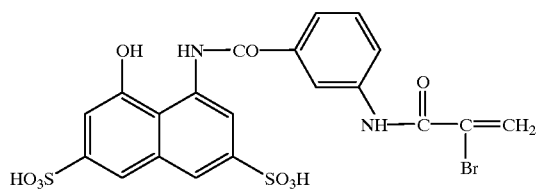

with aspartic acid analogously to Example 1 and coupling onto the resulting compound a diazotised amine of formula

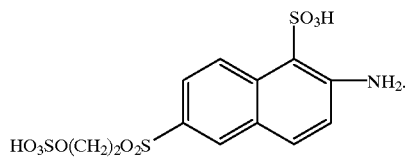

The required naphthalenesulfonic acid compounds are known or can be prepared according to processes known per se.

Application Example 1

2.85 parts of the dye according to Example 1 are dissolved in 100 parts of distilled water and filtered. A customary commercial ink-jet paper or photographic paper or a glossy film (e.g. Epson glossy film) is printed with the resulting ink using a drop-on-demand ink-jet printer.

Application Example 2 a) A silk fabric is pad-dyed with an aqueous liquor containing 150 g/l of a customary commercial alginate thickener, 50 g/l of urea and 50 g/l of an aqueous ammonium tartrate solution (25%) (liquor uptake 90%), and dried.

b) The silk fabric pretreated in accordance with a) is printed with an ink A containing 5% by weight of the dye according to Example 1,
20% by weight of 1,2-propylene glycol and
75% by weight of water using a drop-on-demand piezo ink-jet head. The print is dried and fixed at 102° C. in saturated steam and then washed thoroughly.

Application Example 3 a) Mercerised cotton satin is pad-dyed with a liquor containing 30 g/l of sodium carbonate (liquor uptake 70%) and dried.

b) The cotton satin pretreated in accordance with Step a) is printed with an aqueous ink having a viscosity of 2 mpa·s, containing 15% by weight of the dye according to Example 1,
15% by weight of 1,2-propylene glycol,
0.5% by weight of borax and
69.5% by weight of water using a drop-on-demand ink-let head (bubble jet). The print is dried completely, fixed for 4 minutes at 102° C. in saturated steam, cold-rinsed, washed thoroughly at boiling, rinsed again and dried.

Application Example 4 a) A printing ink is prepared from:

8% by weight of the dye according to Example 60,
8% by weight of nitrocellulose A 400,
6% by weight of ketone resin SK,
1% by weight of dibutyl phthalate,
20% by weight of 1-methoxypropanol,
20% by weight of methyl isobutyl ketone and
37% by weight of ethanol (abs.), by mixing the solvents with one another, and then dissolving the resins and finally the dye therein. The printing ink is printed using a screen onto a vinyl-coated aluminium sheet or aluminium foil.

Application Example 5

10 parts of wool knitting yarn are stirred into a dye bath at 30° C. containing, per 100 parts of water, 0.8 part of the dye according to Example 1, 0.5 part of sodium sulfate and 2 parts of sodium acetate, and the pH value is adjusted to 4.5 with acetic acid (80%). The liquor is brought to boiling over the course of 45 minutes and maintained at boiling temperature for a further 45 to 70 minutes. The dyed material is then removed, rinsed thoroughly with cold water and dried.

Application Example 6

3 parts of the dye obtained according to Example 1 are sprinkled, with rapid stirring, into 100 parts of a stock thickener containing 50 parts of 5% sodium alginate thickener, 27.8 parts of water, 20 parts of urea, 1 part of sodium m-nitrobenzenesulfonate and 1.2 parts of sodium hydrogen carbonate. A cotton fabric is printed with the resulting print paste and dried, and the resulting printed material is steamed for 2 minutes at 102° C. in saturated steam. The printed fabric is then rinsed, optionally soaped at boiling, rinsed again and then dried.

What is claimed is:

1. A monoazo, polyazo, metal complex azo, stilbene, anthraquinone, phthalocyanine, formazan or dioxazine dye comprising at least one structural unit of formula (1)

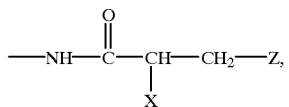
(1)

wherein
- Z is $C_1$–$C_{24}$alkoxy unsubstituted or substituted in the alkyl moiety, or uninterrupted or interrupted in the alkyl moiety by oxygen; phenoxy unsubstituted or substituted in the phenyl ring; $C_1$–$C_4$alkylthio unsubstituted or substituted in the alkyl moiety; phenylthio unsubstituted or substituted in the phenyl ring; amino; N-mono- or N,N-di-$C_1$–$C_{24}$alkylamino, unsubstituted or substituted in the alkyl moiety, or uninterrupted or interrupted in the alkyl moiety by oxygen or by a radical —$NR_1$— in which $R_1$ is hydrogen or $C_1$–$C_4$alkyl; $C_{10}$–$C_{20}$terpeneamino; $C_5$–$C_7$cycloalkylamino unsubstituted or substituted in the cycloalkyl ring; phenyl- or naphthyl-amino or N—$C_1$–$C_4$alkyl-N-phenyl- or N—$C_1$–$C_4$alkyl-N-naphthyl-amino, each unsubstituted or substituted in the aryl moiety; morpholino; piperazin-1-yl or piperidin-1-yl, and
- X is hydroxy, chlorine or bromine, or X has the meanings given for Z.

2. A dye according to claim 1, wherein
Z is $C_1$–$C_{12}$alkoxy unsubstituted or substituted in the alkyl moiety by hydroxy, sulfo or by carboxy or uninterrupted or interrupted in the alkyl moiety by one, two or three oxygen atoms; $C_1$–$C_4$alkylthio unsubstituted or substituted in the alkyl moiety by hydroxy, sulfo or by carboxy; N-mono- or N,N-di-$C_1$–$C_{14}$alkylamino, unsubstituted or substituted in the alkyl moiety by phenyl (which may itself be substituted by carboxy, carbamoyl, sulfo or by sulfamoyl), amino, $C_2$–$C_4$alkanoylamino, hydroxy, sulfo, sulfato, carboxy, carbamoyl or by sulfamoyl or uninterrupted or interrupted in the alkyl moiety by one, two or three oxygen atoms or —NH— groups; $C_{20}$diterpeneamino; $C_5$–$C_7$cycloalkylamino unsubstituted or substituted by $C_1$–$C_4$alkyl or by carboxy; phenylamino or N—$C_1$–$C_4$alkyl-N-phenylamino, unsubstituted or substituted by carboxymethyl, $C_1$–$C_4$alkoxy, carboxy, carbamoyl, N—$C_1$–$C_4$-alkylcarbamoyl (which may itself be further substituted in the alkyl moiety by carboxy), sulfo or by halogen; naphthylamino substituted in the aryl moiety by sulfo; morpholino; piperazin-1-yl or piperidin-1-yl.

3. A dye according to claim 1, wherein
Z is $C_1$–$C_4$alkylthio unsubstituted or substituted in the alkyl moiety by hydroxy, sulfo or by carboxy; N-mono- or N,N-di-$C_1$–$C_{14}$alkylamino, unsubstituted or substituted in the alkyl moiety by phenyl (which may itself be substituted by carboxy, carbamoyl, sulfo or by sulfamoyl), amino, $C_2$–$C_4$alkanoylamino, hydroxy, sulfo, sulfato, carboxy, carbamoyl or by sulfamoyl or uninterrupted or interrupted in the alkyl moiety by one, two or three —NH— groups; $C_{20}$diterpeneamino; phenylamino or N—$C_1$–$C_4$alkyl-N-phenylamino, unsubstituted or substituted by carboxymethyl, $C_1$–$C_4$alkoxy, carboxy, carbamoyl, N—$C_1$–$C_4$alkylcarbamoyl (which may itself be further substituted in the alkyl moiety by carboxy), sulfo or by halogen; naphthylamino substituted in the aryl moiety by sulfo; morpholino; piperazin-1-yl or piperidin-1-yl.

4. A dye according to claim 1, wherein
Z is $C_1$–$C_4$alkylthio unsubstituted or substituted in the alkyl moiety by hydroxy, sulfo or by carboxy; N-mono-$C_1$–$C_6$alkylamino unsubstituted or substituted in the alkyl moiety by phenyl (which may itself be substituted by carboxy), amino, hydroxy, sulfo, sulfato, carboxy or by carbamoyl or uninterrupted or interrupted in the alkyl moiety by one or two —NH— groups; N,N-di-$C_1$–$C_6$alkylamino unsubstituted or substituted in the alkyl moiety by amino, hydroxy, sulfo, sulfato, carboxy or by carbamoyl; morpholino or piperazin-1-yl.

5. A dye according to claim 1, wherein
X is bromine.

6. A dye according to claim 1 corresponding to formula (2)

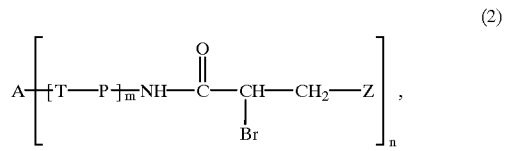
(2)

wherein
- A is the radical of a monoazo, polyazo, metal complex azo, anthraquinone, phthalocyanine, formazan or dioxazine chromophore,
- T is a radical of formula

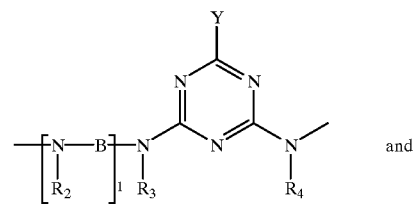
and

- B is a branched or straight-chain $C_2$–$C_{12}$alkylene radical that may be interrupted by 1, 2 or 3 —O— members and is unsubstituted or substituted by hydroxy, sulfo, sulfato, cyano or by carboxy, or
- a phenylene radical unsubstituted or substituted by $C_1$–$C_4$alkyl, $C_1$–$C_4$alkoxy, $C_2$–$C_4$alkanoylamino, sulfo, halogen or by carboxy,
- $R_2$, $R_3$ and $R_4$ are each independently of the others hydrogen or unsubstituted or substituted $C_1$–$C_4$alkyl,
- Y is halogen or hydroxy, or has the meanings given for Z in claim 1, and
- I is the number 0 or 1,
- P is a phenylene radical unsubstituted or substituted by $C_1$–$C_4$alkyl, $C_1$–$C_4$alkoxy,
- $C_2$–$C_4$alkanoylamino, sulfo, halogen or by carboxy,
- Z is as defined in claim 1,
- m is the number 0 or 1 and
- n is the number 1 or 2.

7. A dye according to claim 6, wherein
A is the radical of a monoazo, polyazo or metal complex azo chromophore.

8. A dye according to claim 6, wherein n is the number 1.

9. A dye according to claim 6, wherein A is a radical of formula (3) or (4)

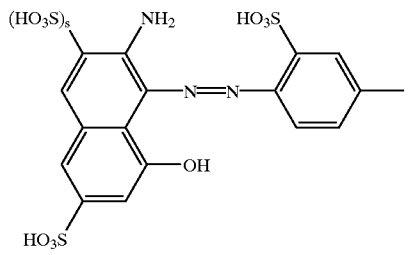
(3)

or

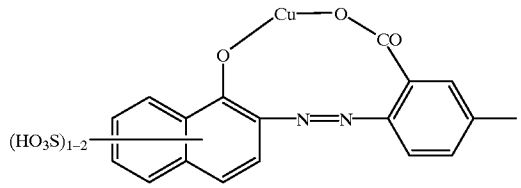
(4)

wherein s is the number 0 or 1,

Z is $C_1$–$C_4$alkylthio unsubstituted or substituted in the alkyl moiety by hydroxy, sulfo or by carboxy; N-mono-$C_1$–$C_6$alkylamino unsubstituted or substituted in the alkyl moiety by phenyl (which may itself be substituted by carboxy), amino, hydroxy, sulfo, sulfato, carboxy or by carbamoyl or uninterrupted or interrupted in the alkyl moiety by one or two —NH— groups; N,N-di-$C_1$–$C_6$alkylamino unsubstituted or substituted in the alkyl moiety by amino, hydroxy, sulfo, sulfato, carboxy or by carbamoyl; morpholino or piperazin-1-yl, P is a phenylene radical unsubstituted or substituted by sulfo, m is the number 0 or 1, n is the number 1, T is the radical given in claim 6, wherein $R_3$ and $R_4$ are hydrogen, Y is halogen or hydroxy, or has the meanings given above for Z, and I is the number 0.

10. A process for the preparation of a dye according to claim 1, wherein a monoazo, polyazo, metal complex azo, anthraquinone, phthalocyanine, formazan or dioxazine dye comprising at least one structural unit of formula (5)

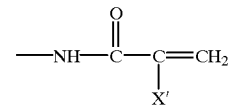
(5)

or at least one precursor corresponding to the structural unit of formula (5) is reacted with a compound of formula (6)

Z—H (6)

in an amount at least equimolar to the structural units of formula (5) or the precursor thereof in the dye molecule, in which formulae X' is chlorine or bromine and Z is as defined in claim 1.

11. An ink comprising a monoazo, polyazo, metal complex azo, stilbene, anthraquinone, phthalocyanine, formazan or dioxazine dye that has at least one structural unit of formula (1)

$$-\text{NH}-\overset{\overset{O}{\|}}{C}-\underset{X}{\text{CH}}-\text{CH}_2-Z,$$
(1)

wherein

Z is $C_1$–$C_{24}$alkoxy unsubstituted or substituted in the alkyl moiety, or uninterrupted or interrupted in the alkyl moiety by oxygen; phenoxy unsubstituted or substituted in the phenyl ring; $C_1$–$C_4$alkylthio unsubstituted or substituted in the alkyl moiety; phenylthio unsubstituted or substituted in the phenyl ring; amino; N-mono- or N,N-di-$C_1$–$C_{24}$alkylamino, unsubstituted or substituted in the alkyl moiety, or uninterrupted or interrupted in the alkyl moiety by oxygen or by a radical —$NR_1$— in which $R_1$ is hydrogen or $C_1$–$C_4$alkyl; $C_{10}$–$C_{20}$terpeneamino; $C_5$–$C_7$cycloalkylamino unsubstituted or substituted in the cycloalkyl ring; phenyl- or naphthyl-amino or N—$C_1$–$C_4$alkyl-N-phenyl- or N—$C_1$–$C_4$alkyl-N-naphthyl-amino, each unsubstituted or substituted in the aryl moiety; morpholino; piperazin-1-yl or piperidin-1-yl, and X is hydrogen, hydroxy, chlorine or bromine, or X has the meanings given for Z.

12. A process for printing textile fibre materials, paper, plastics films or aluminium foils by the ink-jet printing method, which comprises applying to said material an ink according to claim 11.

13. A process for dyeing or printing textile fibre materials, paper, aluminium sheets or aluminium foils, which comprises applying to said material a dye according to claim 1.

* * * * *